United States Patent [19]
Isaak et al.

[11] 3,921,174
[45] Nov. 18, 1975

[54] DIGITAL TRACKING RANGE UNIT

[75] Inventors: Robert D. Isaak; Woodrow H. Littrell, both of San Diego, Calif.

[73] Assignee: The United States of America as represented by the Secretary of the Navy, Washington, D.C.

[22] Filed: Dec. 20, 1963

[21] Appl. No.: 333,267

[52] U.S. Cl. ........ 343/112 D; 235/181; 343/100 CL
[51] Int. Cl.² .......................................... G01S 11/00
[58] Field of Search ........... 343/112.3, 5 DP, 100.7; 235/181, 150.27

[56] References Cited
UNITED STATES PATENTS

| | | | |
|---|---|---|---|
| 3,009,146 | 11/1961 | Luskin | 343/112 |
| 3,025,519 | 3/1962 | Brown et al. | 343/105 |

*Primary Examiner*—Malcolm F. Hubler
*Assistant Examiner*—Richard E. Berger
*Attorney, Agent, or Firm*—R. S. Sciascia; G. J. Rubens; T. M. Phillips

EXEMPLARY CLAIM

1. A digital tracking range unit for use with a correlated signal comprising:

stable frequency pulse generating means;

variable frequency pulse generator means having variable frequency output pulses lower in frequency than said stable frequency pulse generator;

an inhibit gate having an inhibit input, a signal input and an output;

digital range counting means having an add input and a subtract input;

signal generating means for generating a signal of a predetermined pattern, said signal generating means having a shift pulse input, and having an output period depending upon a signal present at said shift pulse input;

signal comparator means having first and second inputs and an output, said first input connected to an output of said signal generating means; and a switch connected to an output of said variable frequency pulse generator for switching said output of said variable frequency pulse generator from said inhibit gate inhibit input and said digital range counter add input to said signal generating means shift pulse input and said digital range counter subtract input;

second switching means connected to said signal generating means shift pulse input for switching said shift pulse input from the output of said inhibit gate to said second output of said stable frequency pulse generating means or to an off position;

a third switch mechanically coupled to said second switch for connection said digital range counter add input from said inhibit gate inhibit input to an off position or to said inhibit gate signal input; and a fourth switch mechanically coupled to said second and third switch for connecting said digital range counter subtract input from said variable frequency pulse generating means output to said inhibit gate signal input or to an off position.

4 Claims, 4 Drawing Figures

DIGITAL TRACKING RANGE UNIT

The invention described herein may be manufactured and used by or for the Government of the United States of America for governmental purposes without the payment of any royalties thereon or therefor.

The present invention relates to a digital tracking range unit and more particularly to a digital tracking range unit utilizing (passive) correllation techniques.

Prior art range units have relied upon an echo ranging technique, i.e., the sending of a pulse of energy which is reflected from the station or object of which the range determination is desired and received back at the transmitting station, the time of transmission being a measure of range. Another well known method is the beacon type of ranging unit in which a signal is transmitted from one station, received at the object or station at which the range is desired to be determined, and retransmitted back to the original station, again the lapsed time between the sending of the original signal and reception of the signal by the transmitting station being a measure of the desired range. These systems both have the obvious disadvantage of requiring a transmission in the first case, by the range taking station and in the second case by both stations. For security reasons in many instances these types of systems are not feasible.

According to the invention, a pseudo-random noise signal is generated and transmitted by the station or object from which the range is to be determined. This type of generator is generally disclosed in U.S. Pat. No. 3,046,545 by E. C. Westerfield entitled "Rapid Correlation Echo-Ranging System" in FIG. 2. This signal is received at the range tracking station and passed to a signal comparator unit which correlates This signal with a self-generated signal of the same pattern. If the two signals are coincident in time an output will result from the correlator.

In the range tracking station a stable oscillator generates a frequency of pulses which shifts the pseudo-random noise generator shift register at the same rate the pseudo-random noise generator shift register is being shifted at the sending station. The output of the pseudo-random noise generator at the range tracking station is then compared with the received pseudo-random noise signal from the sending station and at zero range they will coincide and the correlator or comparator will yield an output. As the sending station increases in range, provision is made to stop shifting the pseudo-random noise generator shift register at the receiving station and at the same time pulse a digital range display unit until the signals are again in coincidence, indicating a correct delay and range indication. If the sending station then closes, range provision is made for additional shift pulses being presented to the pseudo-random noise generator shift register of the receiving station, at the same time subtracting range counts from the range display unit until the two signals are again in correlation indicating a correct range. Thus, a constant monitoring of range or, if desired, a periodic measure of range between two stations is effected without the necessity of echo ranging or a beacon type arrangement, the only transmission being that of a pseudo-random noise which must be correlated to be detected.

An object of the present invention is the provision of a digital tracking range indicator which can be operated without breaking transmission silence requirements.

Another object is to provide a digital tracking range unit in which only conventional components are utilized.

A further object of the invention is the provision of a digital tracking range unit which provides precise range over long periods of time (days or weeks) with no cumulative error except that imposed by oscillation drift.

Still another object is to provide a digital tracking range unit which is easy to operate and requires a minimum of maintenance and adjustment.

Other objects and many of the attendent advantages of this invention will be readily appreciated as the same becomes better understood by reference to the following detailed description when considered in connection with the accompanying drawings in which like reference numerals designate like parts throughout the figures and wherein.

Figure 1:
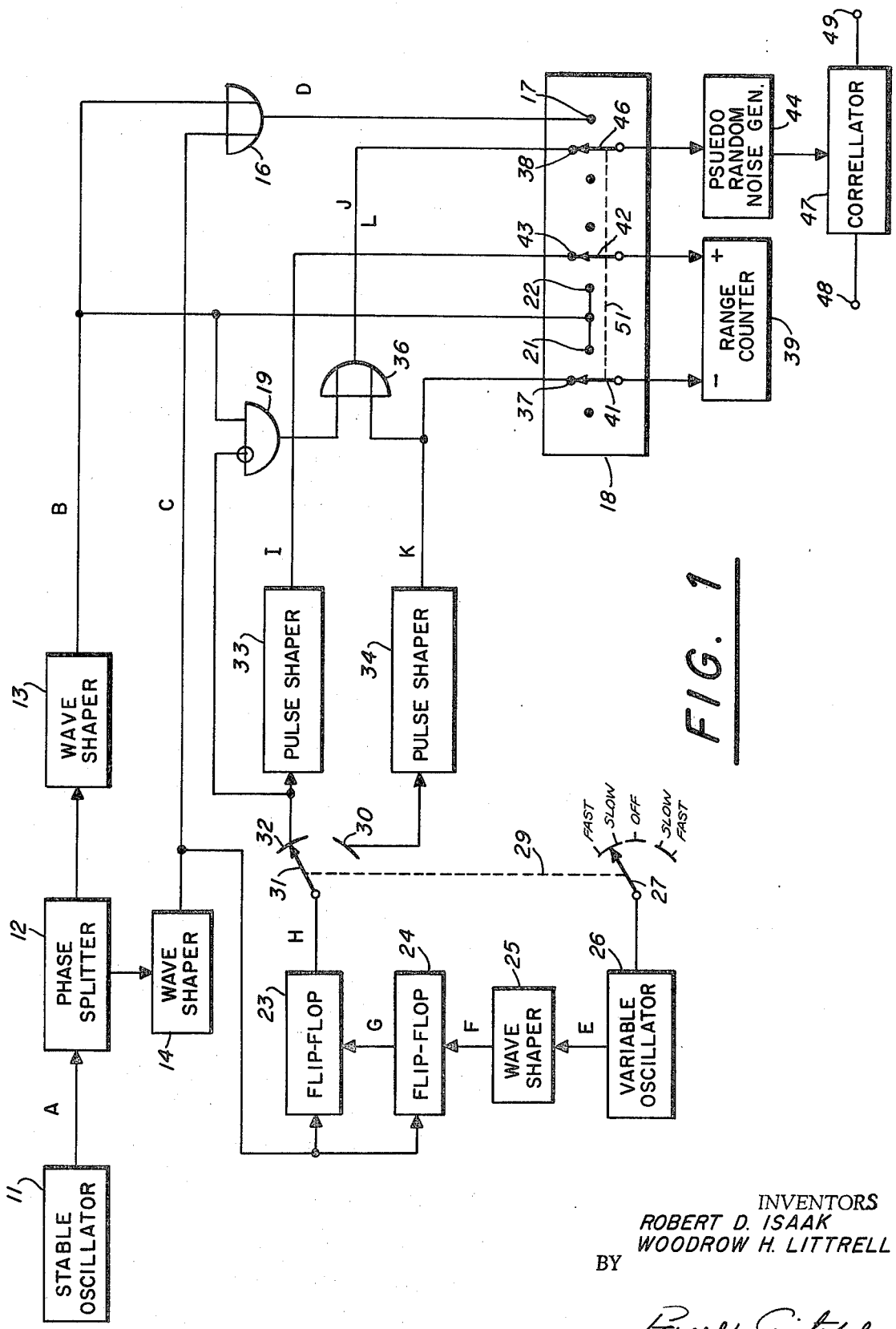
FIG. 1 is a block diagram of one embodiment of the present invention.

Referring to FIG. 1, stable oscillator 11 is coupled to phase splitter 12. The outputs of phase splitter 12 are coupled to wave-shapers 13 and 14. The outputs of wave-shapers 13 and 14 are coupled to the inputs of OR gate 16, the output of which is coupled to terminal 17 of switch 18.

The output of wave-shaper 13 is also coupled to inhibit gate 19 and terminals 21 and 22 of switch 18. The output of wave-shaper 14 is also coupled to reset inputs of flip-flops 23 and 24 respectively. Variable oscillator 26 has a frequency control 27. The output of oscillator 26 is coupled to wave-shaper 25; the output of which is coupled to flip-flop 24. The output of flip-flop 24 is coupled to flip-flop 23, the output of which is coupled to switch-arm 31. Switch-arm 31 and frequency control 27 are ganged as shown by dotted line 29. Contact 32 is connected to pulse shaper 33 and an inhibit input of inhibit gate 19. Contact 30 of switch-arm 31 is connected to pulse shaper 34, the output of which is connected to one input of OR gate 36 and to contact 37 of switch 18.

The output of inhibit gate 19 is connected to another input of OR gate 36. The output of OR gate 36 is connected to terminal 38 of switch 18. Digital range counter 39 has a subtract input connected to switch-arm 41 of switch 18 and an add input connected to switch-arm 42 of switch 18. The output of pulse shaper 33 is connected to terminal 43 of switch 18.

Pseudo-random noise generator 44 has a shift pulse input connected to switch-arm 46 of switch 18 and an output connected to an input of correlator 47. Correlator 47 has another input connected to input terminal 48, and an output connected to output terminal 49. Switch-arms 41, 42 and 46 of switch 18 are all ganged as indicated by dotted line 51.

Figure 2:
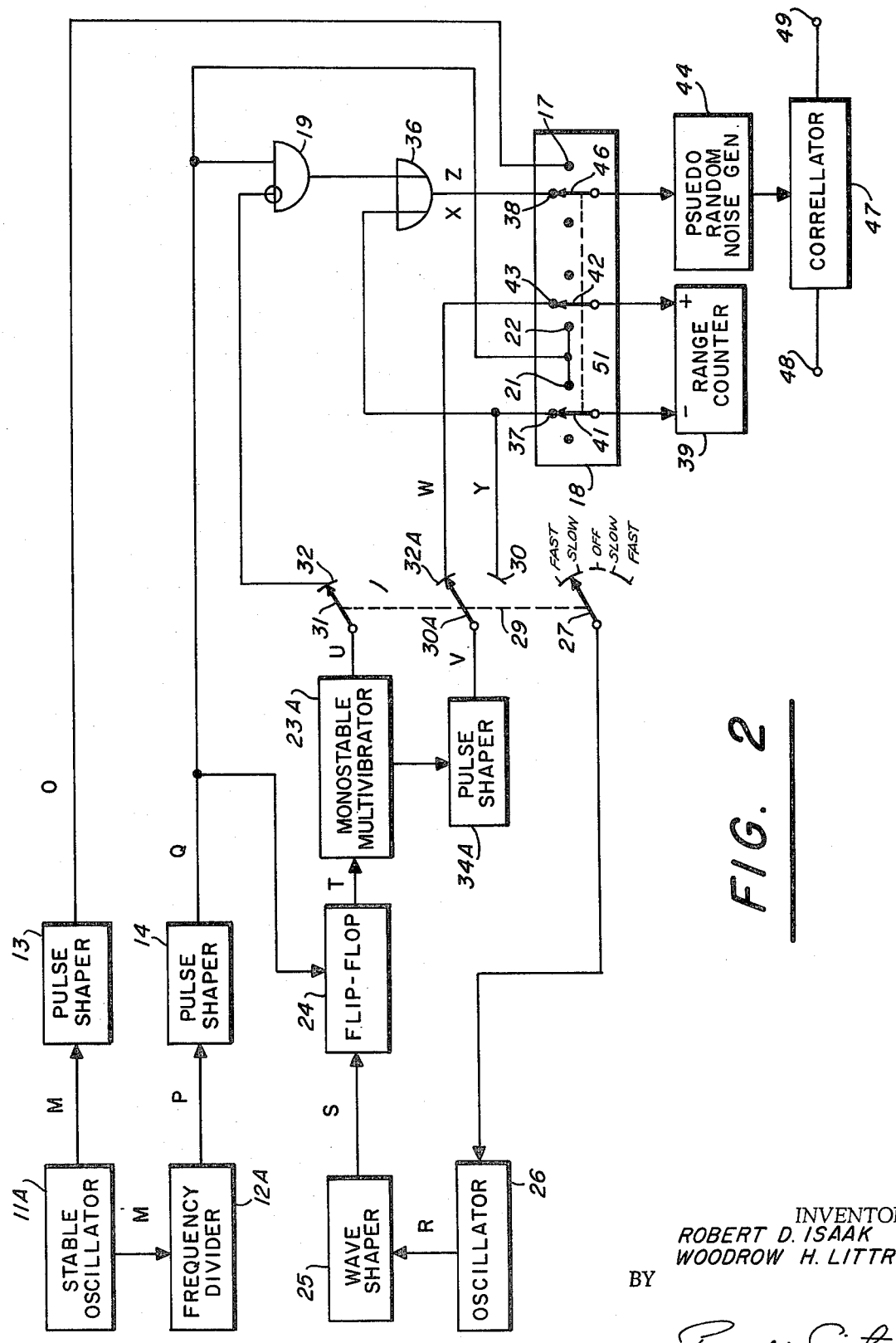
FIG. 2 is a block diagram of another embodiment of the present invention.

Referring to FIG. 2, stable oscillator 11A has one output connected to pulse shaper 13 and another output connected to frequency divider 12a. The output of pulse shaper 13 is connected to terminal 17 of switch 18. The output of divider 12a is connected through pulse shaper 14 to a reset terminal of flip-flop 24, a signal input of inhibit gate 19, and terminals 21 and 22 of switch 18. Oscillator 26 has frequency control arm 27 and an output coupled through wave-shaper 25 to flip-flop 24. The output of flip-flop 24 is coupled to monostable multivibrator 23a, the output of which is connected to switch-arm 31 and through pulse shaper 34A to switch-arm 30a. Contact 32 is connected to an inhibit input of inhibit gate 19. Contact 32a is connected to contact 43 of switch 18. Contact 30 is connected to one input of OR gate 36 and contact 37 of switch 18. The output of inhibit gate 19 is connected to an input of OR gate 36, the output of which is connected to terminal 38 of switch 18. Switch-arms 41, 42 and 46 are ganged as indicated by dotted line 51 and switch-arms 27, 30a and 31 are ganged as indicated by dotted line 29.

Range display 39 has a subtract input connected to switch-arm 41 and an add input connected to switch-arm 42. Pseudo-random noise generator 44 has a shift pulse input connected to switch-arm 46 and an output connected to one input of correlator 47. Correlator 47 has another input connected to terminal 48, and an output connected to output terminal 49.

Figure 3:
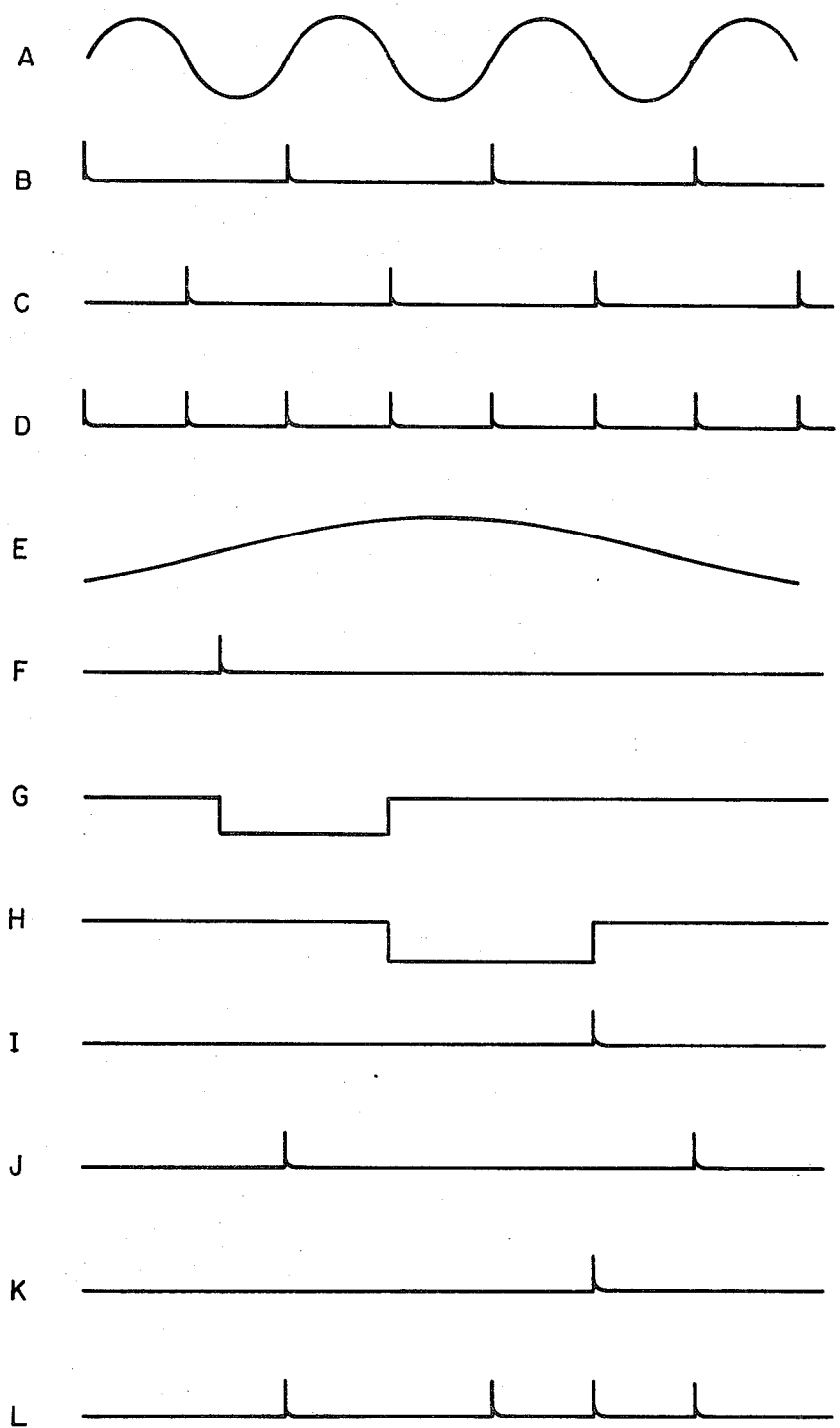
FIG. 3 is a graph showing waveforms present throughout the block diagram of FIG. 1.

Referring to FIG. 3 waveforms A, B, C, D, E, F, G, H, I, J, K and L are shown which appear at points A, B, C, D, E, F, G, H, I, J, K, L, of FIG. 1, respectively.

Figure 4:
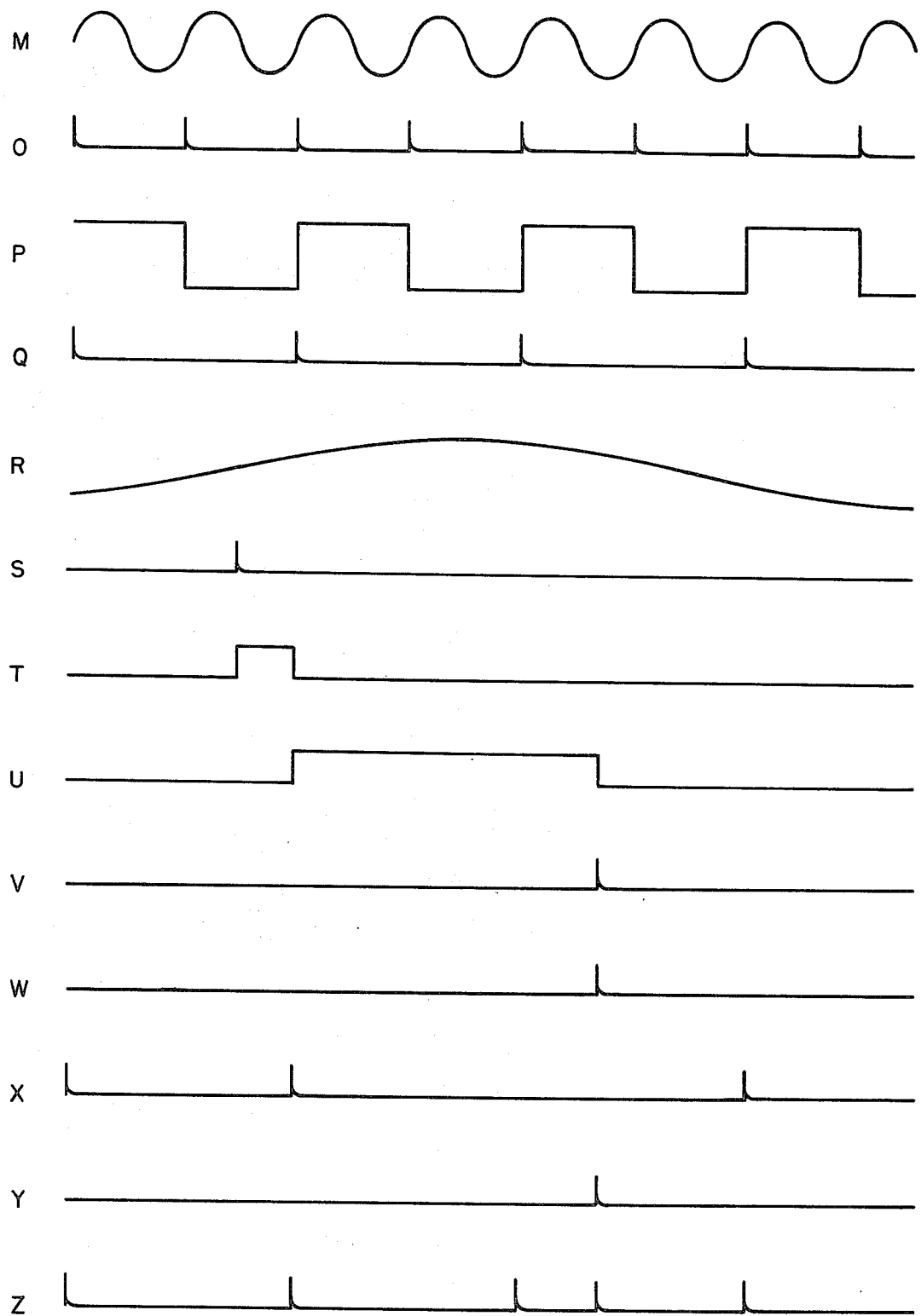
FIG. 4 is a graph showing waveforms present throughout the block diagram of FIG. 2.

Referring to FIG. 4 waveforms M, O, P, Q, R, S, T, U, V, W, X, Y, Z are shown which appear at points M, O, P, Q, R, S, T, U, V, X, Y, Z, respectively, of FIG. 2.

OPERATION

Stable oscillator 11 has an output shown at A and illustrated as waveform A in FIG. 3. This output is applied to phase splitter 12 which has two outputs, each 180° removed in phase from the other which are applied to pulse shapers 13 and 14. The outputs of pulse shapers 13 and 14 are shown as waveforms B and C, respectively in FIG. 3. The pulses are at the same frequency, but one is delayed in time a half cycle with respect to the other. The two pulses are then applied through OR gate 16 to contact 17 of mode switch 18. The output from wave shaper 13 is also passed to inhibit gate 19 and to terminals 21, 22 of switch 18. When the gate 19 is not inhibited and when there is no "subtract input" to OR gate 36, the output of wave shaper 13 is connected to terminal 38 of mode switch 18, and in the normal position (as shown) is the shift pulse which drives the pseudo-random noise generator (which is a specially connected shift register) 44. Hence, with mode switch 18 in a neutral position and switch 27 in the off position, pseudo-random noise generator 44 will be shifted at the same rate as the frequency of stable oscillator 11.

The sending vessel or the one to which the range is being determined has an identical pseudo-random noise generator 44 which is being shifted by a stable oscillator substantially identical to stable oscillator 11 and at an identical frequency. Hence, at zero range the output from the sending station will be received at input terminal 48 and coupled to correlator 47 at the same time the output from pseudo-random noise generator 44 is presented to correlator 47, and since they are in step, correlator 47 will yield an output at output terminal 49 indicating that range display unit 39 is displaying a correct range, in this case, zero.

The inputs to the subtract and add inputs of range display 39 are taken out of subtract shaper 34 and add shaper 33, respectively. When the switch arm 27 is at the off position the variable frequency oscillator 26 has no output, and no input will be present at either the subtract or add inputs of range display 39. As the target or vessel to be ranged upon increases in range, the signal from the target appearing at input terminal 48 will lag the output from pseudo-random noise generator 44, causing no correlation in correlator 47 and no output from output terminal 49. To alleviate this, switch arm 27 is moved upward (as shown) causing the variable frequency oscillator 26 to emit a pulse, shown as waveform E of FIG. 3, which in turn is shaped in wave shaper 25, shown as waveform F, triggering flip-flops 23 and 24 in series. The output of flip-flop 23 is taken through segment 32 of switch arm 31 to add shaper 33 which supplies pulses to range display counter 39 for the opening range condition. At the same time these pulses are presented to the inhibit input of inhibit gate 19 inhibiting a fraction of the shift pulses from going into pseudo-random noise generator 44 until correlator 47 yields an output, again indicating correct range. If the range between the two stations is not changing, switch arm 27 is then moved to the off position awaiting a further range change. If there is a range rate between the two stations, switch arm 27 remains at some off center position in order to provide continuous tracking as indicated by a continuous output from correlator 47.

If the vessel to which a range is being taken begins closing in range the pulses will arrive at correlator 48 ahead of those from pseudo-random noise generator 44 and again no correlated output will appear at terminal 49. In this case switch arm 27 is moved down to the closing position and the output from flip-flop 23 is taken at segment 30 to subtract shaper 34, subtracting range counts from range display counter 39. The output from subtract shaper 34 is also passed through OR gate 36 to add shift pulses to the pseudo-random noise generator 44 in addition to those from shaper 13. This is shown as waveform L of FIG. 3. Again, when correlator 47 yields an output correct range is indicated and switch 27 is returned to the off or neutral position in the constant range case.

Should a large range displacement be present at the time the equipment is initially operated, for example, a large opening of the range, mode switch 18 is then shifted to the left placing the add input of range display counter 39 on contact 22 of switch 18 which is directly connected to the output of wave shaper 13 and range display counter 39 will count the pulses shown in waveform B of FIG. 3 until switch 18 is shifted back to the neutral position. At the same time switch arm 46 is moved to a dead contact removing pseudo-random noise generator 44 from any shift pulses whatsoever. This condition would be retained until the approximate estimated desired range is read on the display 39. Then mode switch 18 is returned to neutral position and switch arm 27 is used for a "fine" range search as described above until correlation output signal 49 is achieved.

Should heavy range closing take place without simultaneous tracking, mode switch 18 is moved to the right which places arm 46 at contact 17 doubling the shift pulse frequency to pseudo random noise generator 44 as shown in waveform D in FIG. 3. At the same time switch arm 41 is placed at contact 21 which causes a subtraction pulse to be applied to the subtract input of range display counter 39 as shown at waveform B in FIG. 3. This condition again is kept until the gross range change is made. Then the switch is returned to neutral and the "fine" correction is made with arm 27 to achieve correlation

Referring to FIGS. 2 and 4, a modification of FIG. 1 is shown. Here stable oscillator 11A is emitting twice the frequency of stable oscillator 11 which is divided down through divider 12a and shaped in pulse shaper 14 to yield the fundamental shifting pulse shown as waveform Q of FIG. 4. The pulse is passed through an inhibit gate at 19 and an OR gate at 36 to contact 38 of mode switch 18 for shifting a shift pulse register in pseudo-random noise generator 44. For the gross range decrease, switch 18 is moved to the right resulting in pseudo-random noise generator 44 being shifted at twice the frequency of pulse shaper 13.

Another modification is shown in the variable frequency oscillator chain. Here, monostable multivibrator 23a, the output of which is used as the inhibit pulse to inhibit gate 19, is set for a period long enough to inhibit one pulse from pulse shaper 14 from passing through inhibit gate 19. This is shown as waveform U in FIG. 4. Another output is taken from monostable multivibrator 23a and passed through shaper 34A yielding a pulse at the trailing edge of the monostable multivibrator waveform U. This pulse is shown as waveform V in FIG. 4 and is applied as an add or subtract pulse to range display unit 39.

Again, if a gross range increase is desired, mode switch 18 is switched to the left adding pulses Q from pulse shaper 14 to the add input of range display counter 39 and removing the shift pulse input from pseudo-random noise generator 44 to allow the sending pseudo-random noise generator input at terminal 48 to catch up with pseudo-random noise generator 44.

It should be understood, of course, that the foregoing disclosure relates to only preferred embodiments of the invention and that it is intended to cover all changes and modifications of the examples of the invention herein chosen for the purposes of the disclosure which do not constitute departures from the spirit and scope of the invention.

Obviously many modifications and variations of the present invention are possible in the light of the above teachings. It is therefore to be understood that within the scope of the appended claims the invention may be practiced otherwise than as specifically described.

What is claimed is:

1. A digital tracking range unit for use with a correlated signal comprising:
   stable frequency pulse generating means for generating pulses having a first output of a frequency F and a second output of a frequency 2F;
   variable frequency pulse generator means having variable frequency output pulses lower in frequency than said stable frequency pulse generator;
   an inhibit gate having an inhibit input, a signal input, and an output;
   digital range counting means having an add input and a subtract input;
   signal generating means for generating a signal of a predetermined pattern, said signal generating means having a shift pulse input, and having an output period depending upon a signal present at said shift pulse input;
   signal comparator means having first and second inputs and an output, said first input connected to an output of said signal generating means;
   a switch connected to an output of said variable frequency pulse generator for switching said output of said variable frequency pulse generator from said inhibit gate inhibit input and said digital range counter add input to said signal generating means shift pulse input and said digital range counter subtract input;
   second switching means connected to said signal generating means shift pulse input for switching said shift pulse input from the output of said inhibit gate to said second output of said stable frequency pulse generating means or to an off position;
   a third switch mechanically coupled to said second switch for connection said digital range counter add input from said inhibit gate inhibit input to an off position or to said inhibit gate signal input; and
   a fourth switch mechanically coupled to said second and third switch for connecting said digital range counter subtract input from said variable frequency pulse generating means output to said inhibit gate signal input or to an off position.

2. A digital tracking range unit for use with a correlated signal comprising:
   a stable frequency oscillator;
   phase splitting means connected to the output of said stable frequency oscillator, said phase splitting means having a first phase output and a second phase output;
   an OR gate having first and second inputs connected to the outputs of said phase splitting means and an output;
   variable frequency pulse generator means having variable frequency output pulses lower in frequency than said stable frequency pulse generator;
   an inhibit gate having an inhibit input, a signal input and an output;
   digital range counting means having an add input and a subtract input;
   signal generating means for generating a signal of a predetermined pattern, said signal generating means having a
   shift pulse input, and having an output period depending upon a signal present at said shift pulse input;
   signal comparator means having first and second inputs and an output, said first input connected to an output of said signal generating means;
   a switch connected to an output of said variable frequency pulse generator for switching said output of said variable frequency pulse generator from said inhibit gate, inhibit input and said digital range counter add input to said signal generating means shift pulse input and said digital range counter subtract input;
   second switching means connected to said signal generating means shift pulse input for switching said shift pulse input from the output of said inhibit gate to said OR gate output or to an off position;
   a third switch mechanically coupled to said second switch for connecting said digital range counter add input from said inhibit gate inhibit input to an off position or to said inhibit gate signal input; and
   a fourth switch mechanically coupled to said second and third switch for connecting said digital range counter subtract input from said variable frequency pulse generating means output to said inhibit gate signal input or to an off position.

3. A digital tracking range unit for use with a correlated signal comprising:
   a stable frequency oscillator;

frequency dividing means connected to one output of said stable frequency oscillator;

variable frequency pulse generator means having variable frequency output pulses lower in frequency than said stable frequency pulse generator;

an inhibit gate having an inhibit input, a signal input and output;

digital range counting means having an add input and a subtract input;

signal generating means for generating a signal of a predetermined pattern, said signal generating means having a shift pulse input, and having an output period depending upon a signal present at said shift pulse input;

a switch connected to an output of said variable frequency pulse generator for switching said output of said variable frequency pulse generator from said inhibit gate, inhibit input and said digital range counter add input to said signal generating means shift pulse input and said digital range counter subtract input;

second switching means connected to said signal generating means shift pulse input for switching said shift pulse input from the output of said inhibit gate to an output of said stable frequency oscillator or to an off position;

a third switch mechanically coupled to said second switch for connecting said digital range counter add input from said inhibit gate inhibit input to an off position or to said inhibit gate signal input; and a fourth switch mechanically coupled to said second and third switch for connecting said digital range counter subtract input from said variable frequency pulse generating means output to said inhibit gate signal input or to an off position.

4. A digital tracking range unit for use with a correlated signal comprising:

stable frequency pulse generating means;

variable frequency pulse generator means having variable frequency output pulses lower in frequency than said stable frequency pulse generator;

an inhibit gate having an inhibit input, a signal input and an output;

digital range counting means having an add input and a subtract input;

signal generating means for generating a signal of a predetermined pattern, said signal generating means having a shift pulse input, and having an output period depending upon a signal present at said shift pulse input;

signal comparator means having first and second inputs and an output, said first input connected to an output of said signal generating means; and a switch connected to an output of said variable frequency pulse generator for switching said output of said variable frequency pulse generator from said inhibit gate inhibit input and said digital range counter add input to said signal generating means shift pulse input and said digital range counter subtract input.

* * * * *